(12) United States Patent
Ito et al.

(10) Patent No.: US 6,548,595 B2
(45) Date of Patent: *Apr. 15, 2003

(54) HEAT-SHRINKABLE THERMOPLASTIC RESIN FILMS

(75) Inventors: Hideki Ito, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 2 days.

This patent is subject to a terminal disclaimer.

(21) Appl. No.: 09/835,342

(22) Filed: Apr. 17, 2001

(65) Prior Publication Data

US 2001/0051238 A1 Dec. 13, 2001

(30) Foreign Application Priority Data

Apr. 27, 2000 (JP) ......................................... 2000-127901
Oct. 3, 2000 (JP) ......................................... 2000-303936

(51) Int. Cl.$^7$ ............................. C08J 3/00; C08K 3/20; C08L 67/00; C08L 73/00; C08L 77/00
(52) U.S. Cl. ........................ 524/599; 524/601; 524/604; 524/605; 528/272
(58) Field of Search .......................... 523/148; 524/599, 524/601, 604, 605; 528/272

(56) References Cited

U.S. PATENT DOCUMENTS 6,383,627 B2 * 5/2002 Hashimoto et al.

FOREIGN PATENT DOCUMENTS

| EP | 0 826 482 | 3/1998 |
| EP | 1 024 162 | 8/2000 |
| EP | 1 055 506 | 11/2000 |
| JP | 2000-135737 | 5/2000 |
| JP | 2000-135738 | 5/2000 |
| JP | 2000-169601 | 6/2000 |
| JP | 2000-169602 | 6/2000 |

* cited by examiner

*Primary Examiner*—Patrick D. Niland
(74) *Attorney, Agent, or Firm*—Morrison & Foerster LLP

(57) ABSTRACT

Heat-shrinkable thermoplastic resin films suitable for use as labels on the bottles, particularly as full labels on the PET bottles, wherein the heat shrinkability in the main shrinkage direction of the film is 5% to 60% after treatment in hot water at 70° C. for 5 seconds and 67% or higher after treatment in hot water at 85° C. for 5 seconds and the heat shrinkability in a direction perpendicular to the main shrinkage direction of the film is 10% or lower after treatment in hot water at 85° C. for 5 seconds. When used as full labels on the bottles, these films can have good shrinkage finish because they cause only rare occurrence of wrinkles, shrinkage spots, and strains during heat shrinkage, and they are therefore extremely useful as full labels.

7 Claims, No Drawings

HEAT-SHRINKABLE THERMOPLASTIC RESIN FILMS

FILED OF INVENTION

The present invention relates to heat-shrinkable thermoplastic resin films, particularly, to heat-shrinkable thermoplastic resin films suitable for use as indicator labels on the beverage bottles. More particularly, it relates to heat-shrinkable thermoplastic resin films for use as full labels to be fitted over the wide area on the barrels of bottles, particularly PET bottles, which cause only rare occurrence of wrinkles, shrinkage spots, and strains during heat shrinkage.

BACKGROUND OF THE INVENTION

For heat-shrinkable films, particularly heat-shrinkable films for use as labels to be fitted on the barrels of bottles, there have been mainly used films made of thermoplastic resins such as polyvinyl chloride, polystyrene or polyester.

In the case of PET bottles, colored bottles may sometimes be used for the protection of contents. However, alternative plans have been studied because colored bottles are not suitable for recycling. One of them involves using uncolored bottles and fitting colored labels over the whole surface of these bottles.

In general, bottles have complicated shapes and the variety of shapes. This may cause a problem of shrinkage finish when the conventional heat-shrinkable films are used as full labels. Particularly, in the case of narrow-mouthed bottles with a great difference in diameter between their barrels and mouths, such as beverage bottles, there is a problem that the conventional heat-shrinkable films may exhibit insufficient shrinkage at the necks of these bottles. Therefore, heat-shrinkable films for use as full labels on such bottles are required to have excellent heat-shrinkage characteristics such as high shrinkability.

As described above, the conventional heat-shrinkable thermoplastic resin films have not had satisfactory performance for use as full labels on the bottles.

SUMMARY OF THE INVENTION

Under these circumstances, the present inventors have extensively studied to provide heat-shrinkable thermoplastic resin films suitable for use as full labels on the bottles, particularly PET bottles, which have excellent heat-shrinkage characteristics and therefore cause only rare occurrence of wrinkles, shrinkage spots, and strains during heat shrinkage. As a result, they have found that such heat-shrinkable thermoplastic resin films can be obtained by the control of heat shrinkability after treatment in hot water.

Thus the present invention provides heat-shrinkable thermoplastic resin films wherein the heat shrinkability in the main shrinkage direction of the film is 5% to 60% after treatment in hot water at 70° C. for 5 seconds and 67% or higher after treatment in hot water at 85° C. for 5 seconds and the heat shrinkability in a direction perpendicular to the main shrinkage direction of the film is 10% or lower after treatment in hot water at 85° C. for 5 seconds, thereby completing the present invention.

DETAILED DESCRIPTION OF THE INVENTION

The present invention provides heat-shrinkable thermoplastic resin films which are suitably used as full labels, particularly on the PET bottles.

The thermoplastic resin may include, but are not particularly limited to, polyvinyl chloride, polystyrene, acrylic, and polyester resins.

In recent years, however, serious problems have been indicated that, for example, chlorine-containing gases will be evolved in the incineration of polyvinyl chloride for disposal and printing is difficult on polystyrene. Further, in the recycling of PET bottles, labels made of resins other than PET, such as polyvinyl chloride or polystyrene, should be separated from the PET bottles. For this reason, heat-shrinkable polyester films requiring no separation in the recycling are preferred.

The following will describe heat-shrinkable polyester films, in particular.

The dicarboxylic acid components, which are contained in the polyesters used in the present invention, may include aromatic dicarboxylic acids such as terephthalic acid, isophthalic acid, naphthalenedicarboxylic acid and orthophthalic acid; aliphatic dicarboxylic acids such as adipic acid, azelaic acid, sebacic acid and decanedicarboxylic acid; and alicyclic dicarboxylic acids.

The polyesters may preferably contain aliphatic dicarboxylic acids (e.g., adipic acid, sebacic acid, decanedicarboxylic acid) in amounts of smaller than 3 mol %. For heat-shrinkable polyester films obtained by the use of polyesters containing these aliphatic carboxylic acids in amounts of 3 mol % or greater, their film stiffness in the high-speed fitting is insufficient.

The polyesters may preferably contain no three or more functional polycarboxylic acids (e.g., trimellitic acid, pyromellitic acid, their anhydrides). For heat-shrinkable polyester films obtained by the use of polyesters containing these polycarboxylic acids, the desired high shrinkability can hardly be attained.

The diol components, which are contained in the polyesters used in the present invention, may include aliphatic diols such as ethylene glycol, propane diol, butanediol, neopentyl glycol and hexanediol; alicyclic diols such as 1,4-cyclohexanedimethanol; and aromatic diols.

The polyesters used in the heat-shrinkable polyester films of the present invention may preferably be those which have glass transition temperatures (Tg) adjusted to 60° C. to 75° C. by the incorporation of at least one diol of 3 to 6 carbon atoms (e.g., propanediol, butanediol, neopentyl glycol, hexanediol).

For the purpose of obtaining heat-shrinkable polyester films having particularly excellent shrinkage finish, neopentyl glycol may preferably be used as one of the diol components, more preferably in an amount of 16 wt % or greater. More preferably, butanediol is used in combination with the other diol components. This is because the use of low Tg components makes excellent shrinkability at low temperatures.

For the purpose of obtaining heat-shrinkable polyester films having high shrinkability, amorphous components may preferably be added in controlled amounts; for example, amorphous polymers such as neopentyl glycol copolymerized polyesters are added in greater amounts.

The polyesters may preferably contain neither diols of 8 or more carbon atoms (e.g., octanediol), nor three or more functional polyhydric alcohols (e.g., trimethylolpropane, trimethylolethane, glycerin, diglycerin). For heat-shrinkable polyester films obtained by the use of polymers containing these diols or polycarboxylic acids, the desired high shrinkability can hardly be attained.

The polyesters may preferably contain none of diethylene glycol, triethylene glycol, and polyethylene glycol, if possible. In particular, diethylene glycol may easily be formed as a by-product component in the polymerization of polyesters. The polyesters used in the present invention may preferably contain diethylene glycol in amounts of smaller than 4 mol %.

When two or more polyesters are used in admixture, the amounts of acid components and the amounts of diol components are relative to the total amount of all acid components and the total amount of all diol components, both of which are contained in these polyesters, independently of whether or not transesterification has been carried out after the mixing.

To improve the self-lubricating properties of the heat-shrinkable polyester films, inorganic lubricants such as titanium dioxide, fumed silica, kaolin and calcium carbonate; or organic lubricants such as long-chain fatty acid esters may preferably be added. The heat-shrinkable polyester films of the present invention may further contain, when so required, additives such as stabilizers, colorants, antioxidants, defoamers, antistatic agents and ultraviolet light absorbers.

The above polyesters can be prepared by polymerization according to the conventional methods, for example, direct esterification method in which dicarboxylic acids are directly reacted with diols, or transesterification in which dimethyl dicarboxylates are reacted with diols. The polymerization may be carried out in batch or continuous manner.

For the heat-shrinkable thermoplastic resin films of the present invention, the heat shrinkability of the film as calculated from the values of length before and after shrinkage by treatment in hot water without a load by the following equation:

$$\text{Heat shrinkability} = \frac{\text{Side length before shrinkage} - \text{Side length after shrinkage}}{\text{Side length before shrinkage}} \times 100(\%)$$

should be 5% to 60%, preferably 10% to 50%, after treatment in hot water at 70° C. for 5 seconds and 67% or higher after treatment in hot water at 85° C. for 5 seconds, both in the main shrinkage direction of the film and should further be 10% or lower, preferably 6% or lower, after treatment at 85° C. for 5 seconds in a direction perpendicular to the main shrinkage direction of the film.

If the films have a heat shrinkability of lower than 5% in the main shrinkage direction of the film after treatment in hot water at 70° C. for 5 seconds, labels made of such films exhibit insufficient shrinkage at low temperatures, requiring the rise in temperature for shrinkage, which is not preferred. In contrast, if the films have a heat shrinkability of higher than 60%, labels made of such films cause jumping by heat shrinkage, which is also not preferred.

If the films have a heat shrinkability of lower than 67% in the main shrinkage direction of the film after treatment of in hot water at 85° C. for 5 seconds, labels made of such films cause insufficient shrinkage at the mouth portions of bottles, which is not preferred. In contrast, if the films have a heat shrinkability of higher than 95%, labels made of such films have a possibility of causing jumping because of their still having shrinkability after the shrinkage, which is also not preferred.

The heat-shrinkage thermoplastic resin films of the present invention may preferably have, but are not particularly limited to, heat shrinkage stress of 15 MPa or smaller, more preferably 14 MPa or smaller, for improving the shrinkage finish as full labels on the bottles, particularly PET bottles. This seems because a decrease in the speed of shrinkage can prevent uneven shrinkage.

The heat-shrinkable thermoplastic resin films of the present invention may preferably be, but not particularly limited to, 10 to 200 μm, more preferably 20 to 100 μm, in thickness as the heat-shrinkable films for labels.

The process for producing the heat-shrinkable thermoplastic films of the present invention will be explained below by a specific example; however, it is not limited to this example.

A resin composition containing the appropriate amounts of thermoplastic resin(s), and if necessary, lubricant(s) and other additive(s) is dried with a hopper dryer, paddle dryer, vacuum dryer, or any other conventional dryer, and melt extruded into a film shape at a temperature of 200° C. to 300° C. In the extrusion, any of the conventional methods may be used, including T-die method and tubular method. The extrusion and the subsequent rapid cooling give an unstretched film.

The unstretched film thus obtained is subjected to stretching at a stretch ratio of 3.0 or higher, preferably 3.5 or higher, and more preferably 4.5 or higher, in the transverse direction (i.e., the direction perpendicular to the direction of extrusion) at a temperature of (Tg−5° C.) or higher but lower than (Tg+15° C.), preferably (Tg+5° C.) or higher but lower than (Tg+15° C.). Stretching at higher temperatures shows a tendency to decrease the shrinkage stress.

The stretched film is then subjected, if necessary, to heat treatment at a temperature of 70° C. to 100° C. Thus, a heat-shrinkable thermoplastic resin film is obtained.

The method of stretching may include uniaxial stretching only in the transverse direction (TD) with a tenter, in which case the film can also be slightly stretched in the machine direction (MD). In such biaxial stretching, any of the sequential or simultaneous biaxial stretching method can be employed, and the film may further be stretched, if necessary, in the machine or transverse direction.

For attaining the purpose of the present invention, the transverse direction (i.e., the direction perpendicular to the direction of extrusion) is practical as the main shrinkage direction of the film; therefore, the above explanation is for an example of the film formation when the main shrinkage direction of the film is taken as the transverse direction. However, the film formation in which the main shrinkage direction of the film is taken as the machine direction (i.e., the direction of extrusion) can also be carried out substantially in the same manner as described above, except that the direction of stretching is turned 90 degrees around the line perpendicular to the film surface.

In the present invention, the unstretched film obtained from the thermoplastic resin may preferably be stretched at a temperature of (Tg−5° C.) or higher but lower than (Tg+15° C.).

If the unstretched film is stretched at a temperature of lower than (Tg−5° C.), the heat-shrinkable thermoplastic resin film thus obtained is difficult to have heat shrinkability such as one of the claimed requirements of the present invention and it has deteriorated transparency, which is not preferred. If the unstretched film is stretched at a temperature of (Tg+15° C.) or higher, the heat-shrinkable thermoplastic resin film thus obtained exhibits insufficient film stiffness in the high-speed fitting and it has a remarkably deteriorated thickness distribution, which is also not preferred.

For the heat-shrinkable thermoplastic resin films of the present invention, the thickness distribution of the film as calculated from the values of film thickness by the following equation:

$$\text{Thickness distribution} = \frac{\text{Maximum thickness} - \text{Minimum thickness}}{\text{Average thickness}} \times 100(\%)$$

may preferably be 6% or lower, more preferably 5% or lower.

The films having a thickness distribution of 6% or lower are easy to achieve the superposition of colors in the three-color printing carried out, for example, in the evaluation of shrinkage finish, whereas the films having a thickness distribution of higher than 6% are not preferred from the view-point of color superposition.

To make even thickness distribution in the heat-shrinkable thermoplastic films of the present invention, the unstretched film may preferably be heated to a prescribed film temperature at a low air flow rate with a heat transmission coefficient of 0.0013 cal/cm²·sec·° C. (0.0054 J/cm²·sec·K) or lower in the step of preheating to be carried out prior to the step of stretching when the unstretched film is stretched in the transverse direction with a tenter.

To prevent heat evolution in the films during stretching to reduce the unevenness of film temperature in the width direction of the films when the main shrinkage direction of the films (i.e., the direction of stretching) is taken as the transverse direction, the step of stretching may preferably be carried out at an air flow rate with a heat transmission coefficient of 0.0009 cal/cm²·sec·° C. (0.0038 J/cm²·sec·K) or higher, more preferably 0.0011 to 0.0017 cal/cm²·sec·° C. (0.0046 to 0.0072 J/cm²·sec·K).

If the air flow rate employed in the step of preheating corresponds to a heat transmission coefficient of higher than 0.0013 cal/cm²·sec·° C. (0.0054 J/cm²·sec·K) or if the air flow rate employed in the step of stretching corresponds to a heat transmission coefficient of lower than 0.0009 cal/cm²·sec·° C. (0.0038 J/cm²·sec·K), the film thus obtained is difficult to have even thickness distribution, so that it causes the deviation of patterns in the super-position of many colors when processed in the multi-color printing, which is not preferred.

EXAMPLES

The present invention will be further illustrated by some examples and comparative examples; however, the present invention is not limited to these examples.

The heat-shrinkable thermoplastic resin films of the present invention were evaluated by the following methods.

(1) Heat Shrinkability

A film was cut into a square of 10 cm×10 cm with two sides parallel to the machine direction and to the transverse direction, respectively. This sample was heat-shrunk by immersion under no load in hot water at a prescribed temperature ±0.5° C. for a prescribed period of time and then measured for side lengths in the machine direction and in the transverse direction, respectively. The heat shrinkability was calculated from the measured values of side lengths by the following equation. The direction of either side correspond ing to the larger value of heat shrinkability was referred to as the main shrinkage direction.

$$\text{Heat shrinkability} = \frac{\text{Side length before shrinkage} - \text{Side length after shrinkage}}{\text{Side length before shrinkage}} \times 100(\%)$$

(2) Shrinkage Finish

A film was printed with three inks of glass, gold and white colors, and formed into a cylindrical label of 10.9 cm in circumferential length along the main shrinkage direction and 18.5 cm in height along the direction perpendicular thereto. The label was fitted on a 500-mL PET bottle (20.6 cm in height and 6.5 cm in barrel diameter; the same bottle as manufactured by YOSHINO KOGYOSHO K. K. and used for "Afternoon Tea" from KIRIN BEVERAGE), and heat-shrunk by allowing the labeled PET bottle to pass through a steam tunnel, model SH-1500-L, available from FUJI ASTEC, INC., at a zone temperature of 80° C. for a passage time of 2.5 seconds. This testing was carried out for 20 different samples of each film. The shrinkage finish was determined by visual observation and evaluated at 2 ranks by the following criteria:

Good: no shrinkage spots, jumping, or insufficient shrinkage was observed;

Poor: shrinkage spots, jumping, or insufficient shrinkage was observed.

(3) Glass Transition Temperature (Tg)

Using a differential scanning calorimeter, model DSC220, available from SEIKO INSTRUMENTS & ELECTRONICS LIMITED, an unstretched film of 10 mg in weight was heated from −40° C. to 120° C. at a heating rate of 20° C./min. to draw a heat absorption curve, from which the glass transition temperature (Tg) was determined. Two tangent lines were drawn before and after the inflection point on the heat absorption curve, and the point of their intersection was regarded as the glass transition temperature (Tg).

(4) Heat-shrinkage Stress

A film was cut in a size of 200 mm×20 cm along the main shrinkage direction and along the direction perpendicular thereto, respectively. Using a tensilon high elongation measuring machine (with a heating oven) available from TOYO SEIKI SEISAKU-SHO, LTD., this sample was chucked at a distance of 100 mm under an atmosphere previously heated to 90° C. but without air flowing, and then measured for stress detected immediately after the door of the heating oven was closed and the air flowing was resumed. The maximum value obtained from the chart was regarded as the heat-shrinkage stress (in MPa).

(5) Thickness Distribution

A film was cut in a size of 5 cm×50 cm along the machine direction and along the transverse direction, respectively. This sample was measured for thickness (the number of measured points=20) with a contact thickness meter, model KG60/A, available from ANRITSU CORPORATION. For each sample, the thickness distribution (i.e., scattering of thickness) was calculated by the following formula. The measurement was repeated for fifty samples of each film and, the mean value of thickness distribution was determined and evaluated on the following criteria:

Thickness distribution=

$$\frac{\text{Maximum thickness} - \text{Minimum thickness}}{\text{Average thickness}} \times 100(\%)$$

Good: 6% or lower;
Fair: higher than 6% but lower than 10%;
Poor: 10% or higher.

The polyesters used in the examples and comparative examples were as follows:

Polyester A: polyethylene terephthalate (intrinsic viscosity (IV)=0.75 dl/g);
Polyester B: a polyester consisting of 70 mol % ethylene glycol and 30 mol % neopentyl glycol, and terephthalic acid (IV=0.72 dl/g);
Polyester C: polybutylene terephthalate (IV=1.20 dl/g);
Polyester D: polypropylene terephthalate (IV=1.10 dl/g).

Example 1

A mixture of 15 wt % polyester A, 75 wt % polyester B, and 10 wt % polyester C was melt at 280° C. and extruded from a T-die, followed by rapid cooling on chill rolls, to give an unstretched film having a Tg of 70° C.

The unstretched film was then preheated until the film temperature came to 85° C. with a heat transmission coefficient of 0.0010 cal/cm$^2$·sec·° C. (0.0042 J/cm$^2$·sec·K) and stretched in a tenter at 83° C. at a stretch ratio of 5 in the transverse direction with a heat transmission coefficient of 0.0014 cal/cm$^2$·sec·° C. (0.0059 J/cm$^2$·sec·K) to give a heat-shrinkable polyester film of 50 μm in thickness. The main shrinkage direction of the film was corresponding to the transverse direction.

Example 2

A mixture of 10 wt % polyester A, 80 wt % polyester B, and 10 wt % polyester C. was melt at 280° C. and extruded from a T-die, followed by rapid cooling on chill rolls, to give an unstretched film having a Tg of 69° C.

The unstretched film was then preheated until the film temperature came to 84° C. with a heat transmission coefficient of 0.0010 cal/cm$^2$·sec·° C. (0.0042 J/cm$^2$·sec·K) and stretched in a tenter at 82° C. at a stretch ratio of 5 in the transverse direction with a heat transmission coefficient of 0.0014 cal/cm$^2$·sec·° C. (0.0059 J/cm$^2$·sec·K) to give a heat-shrinkable polyester film of 50 μm in thickness. The main shrinkage direction of the film was corresponding to the transverse direction.

Example 3

A mixture of 15 wt % polyester A, 80 wt % polyester B, and 5 wt % polyester C was melt at 280° C. and extruded from a T-die, followed by rapid cooling on chill rolls, to give an unstretched film having a Tg of 71° C.

The unstretched film was treated in the same manner as described in Example 1 to give a heat-shrinkable polyester film of 50 μm in thickness.

Example 4

A mixture of 15 wt % polyester A, 75 wt % polyester B, and 10 wt % polyester D was melt at 280° C. and extruded from a T-die, followed by rapid cooling on chill rolls, to give an unstretched film having a Tg of 71° C.

The unstretched film was treated in the same manner as described in Example 1 to give a heat-shrinkable polyester film of 50 μm in thickness.

Example 5

A mixture of 15 wt % polyester A, 60 wt % polyester B, and 25 wt % polyester C was melt at 280° C. and extruded from a T-die, followed by rapid cooling on chill rolls, to give an unstretched film having a Tg of 62° C.

The unstretched film was treated in the same manner as described in Example 1 to give a heat-shrinkable polyester film of 50 μm in thickness.

Comparative Example 1

A heat-shrinkable polyester film of 50 μm in thickness was prepared in the same manner as described in Example 1, except that the stretching temperature was set at 88° C.

Comparative Example 2

A film was prepared in the same manner as described in Example 1, except that the stretching temperature was set at 65° C. The film was whitened all over the width at the outlet of the tenter.

Comparative Example 3

A mixture of 40 wt % polyester A, 50 wt % polyester B, and 10 wt % polyester C was melt at 280° C. and extruded from a T-die, followed by rapid cooling on chill rolls, to give an unstretched film having a Tg of 69° C.

The unstretched film was then preheated until the film temperature came to 84° C. with a heat transmission coefficient of 0.0010 cal/cm$^2$·sec·° C. (0.0042 J/cm$^2$·sec·K), stretched in a tenter at 77° C. at a stretch ratio of 4.47 in the transverse direction with a heat transmission coefficient of 0.0014 cal/cm$^2$·sec·° C. (0.0059 J/cm$^2$·sec·K), and further stretched at a stretch ratio of 1.1 in the same direction under heat treatment at 77° C. for 10 seconds with a heat transmission coefficient of 0.0013 cal/cm$^2$·sec·° C. (0.0055 J/cm$^2$·sec·K) to give a heat-shrinkable polyester film of 50 μm in thickness. The main shrinkage direction of the film was corresponding to the transverse direction.

Comparative Example 4

A mixture of 15 wt % polyester A, 60 wt % polyester B, and 25 wt % polyester C was melt at 280° C. and extruded from a T-die, followed by rapid cooling on chill rolls, to give an unstretched film having a Tg of 62° C.

The unstretched film was then preheated until the film temperature came to 83° C. with a heat transmission coefficient of 0.0010 cal/cm$^2$·sec·° C. (0.0042 J/cm$^2$·sec·K), stretched in a tenter at 70° C. at a stretch ratio of 4.47 in the transverse direction with a heat transmission coefficient of 0.0014 cal/cm$^2$·sec·° C. (0.0059 J/cm$^2$·sec·K), and further stretched at a stretch ratio of 1.1 in the same direction under heat treatment at 73° C. for 10 seconds with a heat transmission coefficient of 0.0013 cal/cm$^2$·sec·° C. (0.0055 J/cm$^2$·sec·K) to give a heat-shrinkable polyester film of 50 μm in thickness. The main shrinkage direction of the film was corresponding to the transverse direction.

Comparative Example 5

A heat-shrinkable polyester film of 50 μm in thickness was prepared in the same manner as described in Example 1, except that stretch ratio was changed to 4.0.

The heat-shrinkable polyester films prepared in Examples 1–5 and Comparative Examples 1–5 were evaluated by the testing methods as described above. The results are shown in Table 1.

TABLE 1

|  | Base material polyesters used (wt %) | | | | Conditions of film formation | | Heat shrinkability after heat treatment in hot water (%) | | | Shrinkage finish | Thickness distribution |
|---|---|---|---|---|---|---|---|---|---|---|---|
|  | | | | | Stretch ratio (times) | Stretching temperature (° C.) | Transverse direction | | Machine direction | | |
|  | A | B | C | D | | | 70° C. | 85° C. | 85° C. | | |
| Example 1 | 15 | 75 | 10 | — | 5.0 | 83 | 17 | 71 | −3 | good | good |
| Example 2 | 10 | 80 | 10 | — | 5.0 | 82 | 18 | 72 | −5 | good | good |
| Example 3 | 15 | 80 | 5 | — | 5.0 | 83 | 14 | 71 | −3 | good | good |
| Example 4 | 15 | 75 | — | 10 | 5.0 | 83 | 22 | 72 | 0 | good | good |
| Example 5 | 15 | 60 | 25 | — | 5.0 | 70 | 40 | 72 | 3 | good | good |
| Comp. Ex. 1 | 15 | 75 | 10 | — | 5.0 | 90 | 10 | 66 | −1 | good | poor |
| Comp. Ex. 2 | 15 | 75 | 10 | — | 5.0 | 65 | — | — | — | — | — |
| Comp. Ex. 3 | 15 | 60 | 25 | — | 5.0 | 78 | 30 | 63 | 4 | poor | fair |
| Comp. Ex. 4 | 40 | 50 | 10 | — | 5.0 | 83 | 24 | 63 | 3 | poor | good |
| Comp. Ex. 5 | 15 | 75 | 10 | — | 4.0 | 83 | 7 | 63 | −3 | poor | good |

Polyester A: TPA//EG = 100//100 (mol %)
Polyester B: TPA//EG/NPG = 100//70/30 (mol %)
Polyester C: TPA//BD = 100//100 (mol %)
Polyester D: TPA//PG = 100//100 (mol %)

As can be seen from Table 1, the heat-shrinkable polyester films of Examples 1–5 had good shrinkage finish and good thickness distribution. This indicates that the heat-shrinkable thermoplastic resin films of the present invention have high quality and high practical availability, and they are particularly suitable for heat-shrinkable labels.

In contrast, the heat-shrinkable polyester film of Comparative Example 1 had poor thickness distribution, and all the heat-shrinkable polyester films of Comparative Examples 3–5 caused the occurrence of wrinkles and insufficient shrinkage during heat shrinkage, so that they had poor shrinkage finish. Thus, all the heat-shrinkable polyester films prepared in Comparative Examples had low quality and low practical availability.

According to the present invention, heat-shrinkable thermoplastic resin films suitable for use as labels on the bottles, particularly as full labels on the PET bottles, can be obtained. When used as full labels on the bottles, these films can have good shrinkage finish because they cause only rare occurrence of wrinkles, shrinkage spots, strains, and insufficient shrinkage during heat shrinkage, and they are therefore extremely useful as full labels.

What is claimed is:

1. A heat-shrinkable-polyester resin film, wherein the heat shrinkability in the main shrinkage direction of the film is 5% to 60% after treatment in hot water at 70° C. for 5 seconds and 67% or higher after treatment in hot water at 85° C. for 5 seconds and the heat shrinkability in a direction perpendicular to the main shrinkage direction of the film is 10% or lower after treatment in hot water at 85° C. for 5 seconds.

2. The heat-shrinkable-polyester resin film according to claim 1, wherein the thickness distribution of the film is 6% or lower.

3. The heat-shrinkable polyester resin film according to claim 1, wherein the glass transition temperature (Tg) of the polyester resin is 60° C. to 75° C.

4. The heat-shrinkable polyester resin film according to claim 1, wherein the polyester resin comprises at least one glycol of 3 to 6 carbon atoms.

5. The heat-shrinkable polyester resin film according to claim 1, wherein the polyester resin comprises at least one glycol selected from the group consisting of ethylene glycol, propanediol, butanediol, neopentyl glycol, and hexanediol.

6. The heat-shrinkable polyester resin film according to claim 1, wherein the film has heat shrinkage stress of 17 MPa or smaller.

7. The heat-shrinkable polyester resin film according to claim 1, wherein the heat shrinkability in the main shrinkage direction of the film is 10% to n50% after treatment in hot water at 70° C. for 5 seconds and 67% or higher after treatment in hot water at 85° C. for 5 seconds.

* * * * *